United States Patent [19]
Jarke et al.

[11] Patent Number: 5,273,307
[45] Date of Patent: * Dec. 28, 1993

[54] LIGHTWEIGHT, COMPACT, ERECTABLE/COLLAPSIBLE WHEELED SEAT

[75] Inventors: Joseph M. Jarke, Austin, Tex.; Ole I. Thorsen, La Conner, Wash.

[73] Assignee: Jarke-Thorsen Products, Inc., Austin, Tex.

[*] Notice: The portion of the term of this patent subsequent to Dec. 4, 2007 has been disclaimed.

[21] Appl. No.: 621,422

[22] Filed: Nov. 30, 1990

Related U.S. Application Data

[63] Continuation of Ser. No. 409,469, Sep. 19, 1989, Pat. No. 4,974,870.

[51] Int. Cl.⁵ .................... B62B 7/06; B62B 11/00
[52] U.S. Cl. .................... 280/643; 280/650; 297/17
[58] Field of Search ............ 280/30, 639, 641, 642, 280/643, 650, 37, 647, 648; D12/131; 297/16, 17, 19, 30, 42, 44, 51, 54, DIG. 4

[56] References Cited

U.S. PATENT DOCUMENTS

| | | | |
|---|---|---|---|
| D. 297,722 | 9/1988 | Siwersson et al. | D12/131 |
| D. 300,733 | 4/1989 | Wagner | D12/131 |
| 630,427 | 8/1899 | Turner | 190/2 |
| 2,447,557 | 8/1948 | Blaney | 280/642 |
| 2,528,676 | 11/1950 | Walters | 297/17 |
| 2,532,863 | 12/1950 | Taylor | 297/16 |
| 2,589,372 | 3/1952 | Hake | 297/17 |
| 2,729,276 | 1/1956 | Volney | 297/17 |
| 2,966,204 | 12/1960 | Caravias | 297/17 |
| 3,544,157 | 12/1970 | Muller | 297/17 |
| 3,674,306 | 7/1972 | Botney | 297/17 |
| 3,765,718 | 10/1973 | Chen | 297/17 |
| 3,909,061 | 9/1975 | Johnson | 297/17 |
| 3,968,991 | 7/1976 | Maclaren | 297/45 |
| 4,025,088 | 5/1977 | Rothschild | 280/644 |
| 4,045,051 | 8/1977 | Igarashi et al. | 280/644 |
| 4,164,354 | 8/1979 | Rodaway | 280/647 |
| 4,369,987 | 1/1983 | Witherell | 280/644 |
| 4,405,142 | 9/1983 | Whetstine | 297/45 |
| 4,415,177 | 11/1983 | Hale et al. | 280/650 |
| 4,527,829 | 7/1985 | Fanslau et al. | 297/17 |
| 4,632,409 | 12/1986 | Hall et al. | 280/643 |
| 4,974,870 | 12/1990 | Jarke et al. | 280/643 |

FOREIGN PATENT DOCUMENTS

| | | | |
|---|---|---|---|
| 2302066 | 9/1976 | France | |
| 729551 | 5/1955 | United Kingdom | 280/37 |
| 2161455 | 1/1986 | United Kingdom | |

Primary Examiner—Richard M. Camby
Attorney, Agent, or Firm—Richard J. Smith

[57] ABSTRACT

The seat comprises a front end and a back end interconnected by foldable sides and a top which can be swung into a vertical position and inserted into the back and when the seat is collapsed. The ends are shallow, rectangular boxes with their smaller surfaces oriented top and bottom when the seat is erected. it further comprises two handles detachably attached to the back end and stored inside the front end when the seat collapsed. The sides are hinged such that their centers fold inward when the seat is collapsed, allowing the ends of the seat to move together and be latched together. There are four casters, one at each corner of the bottom of the erected seat and a foot rest which swings out of the front of the seat. The casters are lockable to prevent the seat from rolling when desired. A carrying handle is attached to the front end of the top of the seat and is accessible for carrying the seat when the seat is collapsed with the top inserted and locked into the back end. Erected, the seat is sized to fit in the aisles of commercial aircraft. Collapsed, its size and shape conform to airline regulations for carry-on luggage.

18 Claims, 4 Drawing Sheets

LIGHTWEIGHT, COMPACT, ERECTABLE/COLLAPSIBLE WHEELED SEAT

This is a continuation of copending application Ser. No. 07/409,469 filed on Sep. 19, 1989 now issued U.S. Pat. No. 4,974,870.

BACKGROUND OF THE INVENTION

1. Field

This invention is in the field of wheeled vehicles, particularly wheeled seats and chairs and, more particularly, wheeled seats which can be collapsed into compact form carriable by one hand. A closely related field is that of foldable or collapsible seats and chairs.

2. Prior Art

The patents listed below are a sampling of the prior art known to the subject inventor.

| | |
|---|---|
| 630,427 | 3,909,061 |
| 2,528,676 | 3,968,991 |
| 2,589,372 | 4,025,088 |
| 2,729,276 | 4,164,354 |
| 2,996,204 | 4,369,987 |
| 3,544,157 | 4,405,042 |
| 3,674,306 | 4,415,177 |
| 3,765,718 | 4,527,829 |

The art shown in U.S. Pat. Nos. 4,369,987; 4,415,177 and 4,527,829 is considered to come closest to addressing the problem solved by the subject invention. However, none of the prior art is known to have provided solutions to the problem good enough to achieve significant commercial success with a collapsible wheeled seat. Such success is considered to require a seat which offers an optimum compromise among its utility, reliability, cost, weight, and its size and shape, ready to use when collapsed. These factors are obviously interrelated since the utility of the seat is related to its weight and its sizes and shapes. Also, reliability, weight and cost are heavily interrelated.

The primary objective of the subject invention is to provide a collapsible wheeled seat which provides an optimum compromise among the factors recited. The prime objective of the invention is that it be usable for moving freely through narrow entrances and passageways and for maneuvering about in small areas. Further, specific objectives are that the invention be reliable, i.e. structurally sound and not inadvertently collapsible, light enough to be easily carried by one hand, sized and shaped when collapsed to conform to airline carry-on luggage regulations, sized and shaped when ready for use to fit freely but closely in airplane aisles and restrooms and of reasonable cost.

SUMMARY OF THE INVENTION

The subject collapsible wheeled seat is intended for use by persons who do not have full use of their legs. It provides a wheeled seat equipped with a foot rest, back rest and handles for use in propelling and guiding the seat. It is sized and shaped when ready for use to be as large as possible while fitting readily in aisles and lavatories in commercial aircraft. It is collapsible and sized and shaped when collapsed to conform to airline regulations for carry-on luggage.

The fully erected seat is box-like in shape, having a top, two sides, two ends and an open bottom. Two handles with a fabric back rest stretched between them are attached to one end of the seat. Each handle comprises an upright portion detachably attached at its lower end to the end of the seat and formed at its upper end to provide a handle which is essentially horizontal and extends away from the seat. The back rest is attached at its ends to the vertical portions. The end of the seat to which the handles are attached is termed the back end of the seat.

A portion of the front end of the seat is hinged horizontally across the front surface near its lower edge and folds outward and downward to form a foot rest. It is held closed by a latch when not in use and held at the proper angle when open by two straps, one at each end of the foot rest.

Each end is a shallow box and the open faces of the boxes face each other and are interconnected by hinged panels as described below. When the seat is collapsed the handles are detached and stored inside the front end, held in place by retaining straps or clips. The top of the seat is a panel having pins extending laterally from its back end into vertical grooves in and extending a short distance above the inner surfaces of the side portions of the back end. There is a slot in the top of the back end, extending laterally from groove to groove. When the seat is being collapsed the top is swung upward about the pins until it is parallel to the broad surface of the end and then it is lowered through the slot, into the end, with the pins moving in the grooves.

There are also pins extending laterally from the front end of the top panel and these pins are manually retractable and spring loaded to extend. When the top is being inserted into the end the retractable pins are held retracted until the seat is fully inserted and then released. Upon release they engage the slots and retain the top inserted in the end. When the seat is fully erected, these pins engage holes in the front end of the seat to hold the top in place so that the seat can be maneuvered by the carrying grip attached to the front end of the top.

The grip is similar to an attache case handle. It extends above the top of the back end when the seat top is fully inserted into the end and is used for carrying the collapsed seat.

Each of the sides of the seat comprise two rectangular panels having vertical and horizontal edges. The two panels are hinged together at their adjoining vertical edges. The other vertical edge of one panel is hinged to the front end of the seat and the other vertical edge of the other panel is hinged to the back end of the seat. The hinges are arranged such that the joined vertical edges of each pair of panels can move toward each other, i.e. toward the center vertical plane of the seat as the panels are folded against each other on each side. As they fold, the ends are drawn together and, when the folding is complete, the ends are in close proximity to each other and latched together to complete the collapsing of the seat, the foot rest in its closed position, the handles and back rest stored in the front end and the top inserted into the back end.

There are three accessories for the seat: a carrying case, snap-on cushion and a seat belt. The cushion is stored in the carrying case along with the seat when the seat is collapsed. The carrying case is equipped with two loops that allow carrying the case on the handles of a conventional wheel chair.

To erect the seat, the ends are unlatched from each other and moved apart until the panels on each side are fully open, coplanar and held so by latches, one per each side, pivoted to one panel and engaging a bracket on the other. The handles, seat belt, cushion and back rest are then removed from inside the front end. The handles are attached to the back end. The top is then extracted from the back end and the cushion is snapped into place. The top is then swung into its in-use position and the seat belt, if not already attached to the handles, is attached. The foot rest is then unlatched and opened and the seat is ready for use.

The invention is described in more detail below with reference to the attached drawings.

DETAILED DESCRIPTION OF THE INVENTION

Figure 1:
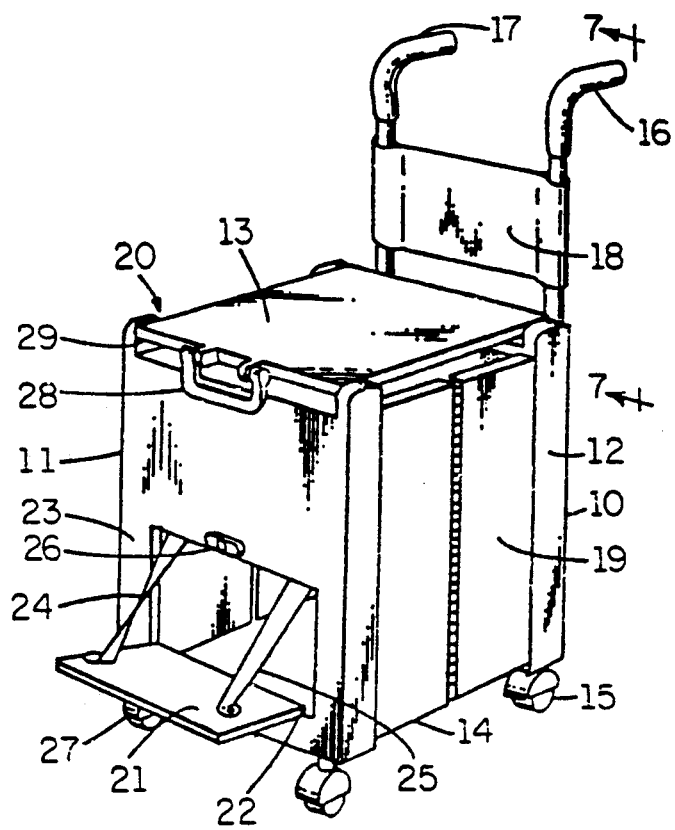
FIG. 1 is a perspective view of the seat ready for use.

The subject seat is for use by persons not having full use of their legs. It is erectable/collapsible and enables free movement through narrow entrances and passageways and maneuvering in small areas. Erected and ready for use it is sized and shaped to provide optimum utility in the space available in commercial airplanes. Collapsed it is sized and shaped to conform to commercial airline regulations relating to carry-on baggage. FIG. 1 is a perspective view of the seat 10 erected and ready for use. It comprises a front end 11, a back end 12, a top 13, an open bottom 14, four casters, one at each corner of the bottom, caster 15 being typical, handles 16 and 17 attached to the back end with back rest 18 stretched between them and first and second sides, side 19 being typical and side 20 not visible in this view. Foot rest 21 is a panel hinged at 22 to swing outward and downward from surface 23 of the front end into its erected condition. Straps 24 and 25 limit its travel to its erected condition and latch elements 26 and 27 cooperate to hold it in its stored position when desired. Grip 28 pivoted to end 29 of top 13 serves as the carrying handle for the chair in its collapsed mode, as explained below.

Figure 2:
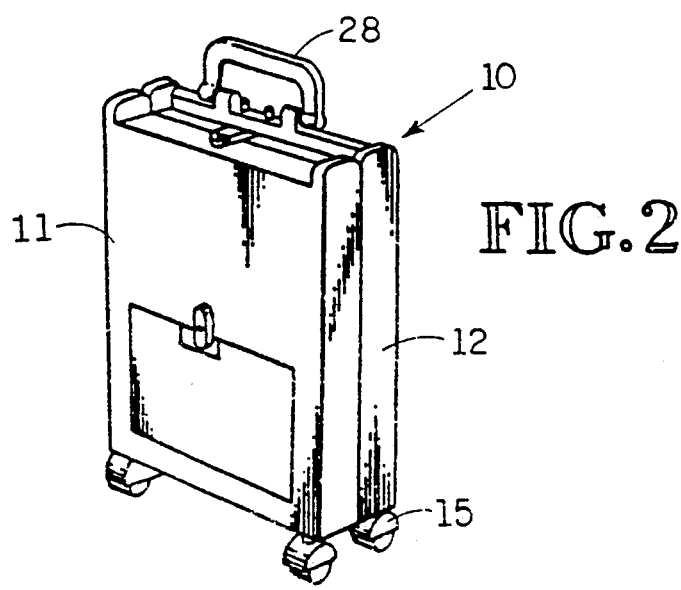
FIG. 2 is a perspective view of the seat collapsed.

Ends 11 and 12 are shallow boxes, each having a closed face, an open face, two sides and a top and a bottom. The handles and backrest are detachable and are stored inside front end 11 when the seat is collapsed. FIG. 2 illustrates the seat in its collapsed condition and ready to be carried.

Figure 3:
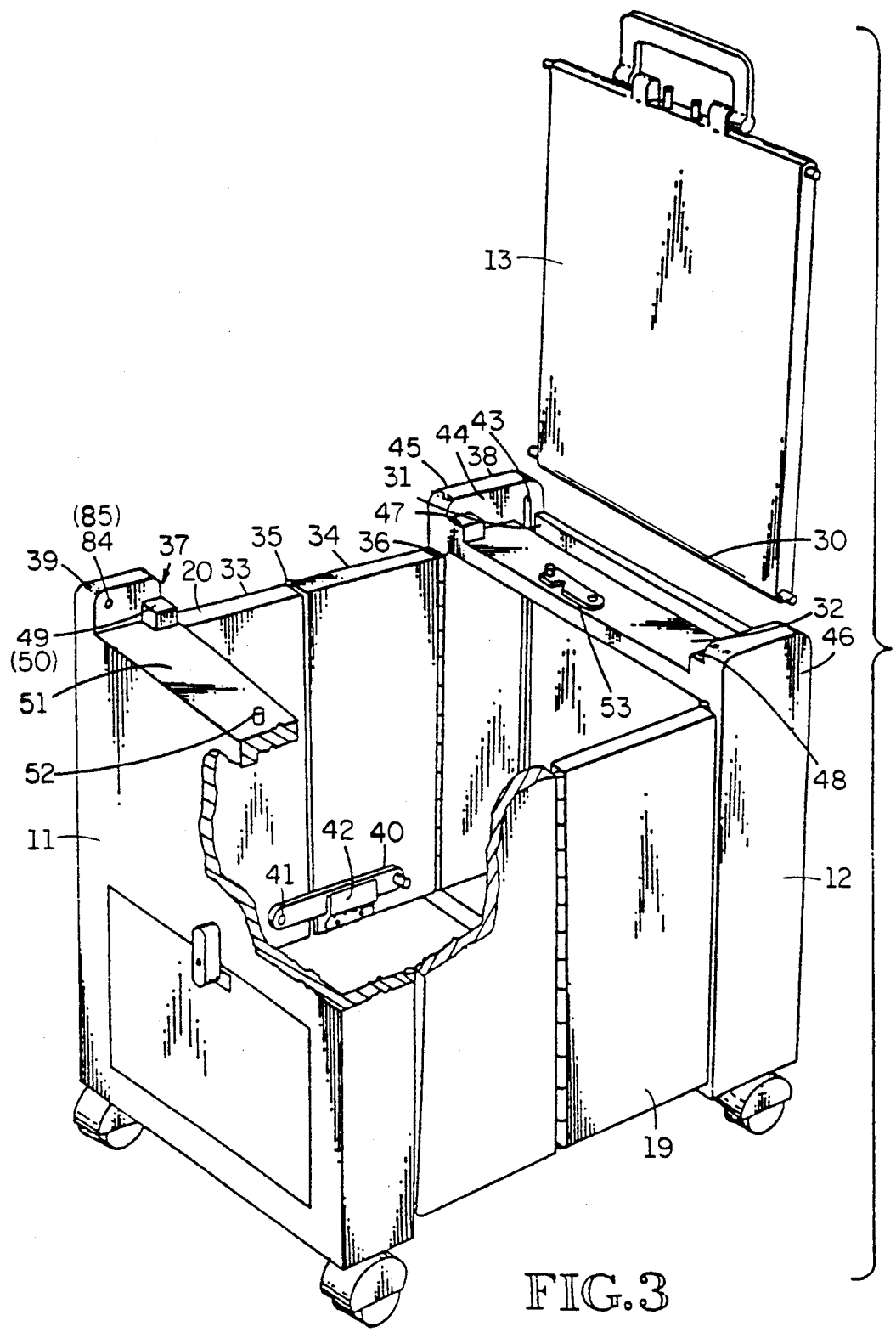
FIG. 3 is a perspective sectional view of the seat showing interior details.

In FIG. 3, a sectional view showing interior details of the seat, the handles and back rest have been removed and top has been pivoted so that its broad surfaces are parallel to the broad surface of the back end. The top pivots about pins which extend laterally from its back end 30 and engage grooves in the inner surfaces of the sides of the back end. The pins, grooves and related details are described below with reference to FIG. 5. As explained in more detail below, the top slides into the back end through slot 31 in top 32 of the back end into its collapsed condition as part of the collapsing procedure.

As shown in FIG. 3, in the erected condition of the seat the open faces of the ends face each other and the ends are interconnected by the sides. Each side of the seat comprises two panels, panels 33 and 34 being typical. In each side the panels are connected by a hinge 35 where they adjoin and hinged at their other long edges 36 and 37 (not visible in this view) to the sides 38 and 39 respectively of the front and back ends. The panels of each side are unfolded, co-planar and held so by latch bar 40 pivotally connected to panel 34 at point 41 and engaging bracket 42 attached to panel 35. When the latch is pivoted out of engagement with bracket 42, the panels are free to pivot with respect to each other and the front and back ends on the hinges. The hinges are arranged such that the adjoining edges of the panels move inward as shown in FIG. 4, ultimately allowing the two ends to move into contact with each other as shown in FIG. 2.

In FIG. 3, groove 43 is visible and is one of the grooves in the inner surfaces of the sides of the back end, surface 44 being typical. The groove(s) extend above the top 32 of the back end in extension(s) 45 and 46. Protrusions 47 and 48 support the top when it is in its in-use position. Protrusions 49 and 50 (not shown in this view) on top 51 of the front end support the top at the front end. The protrusions provide clearance for latch elements 52 and 53 which latch the front and back ends together when the seat is collapsed.

Figure 4:
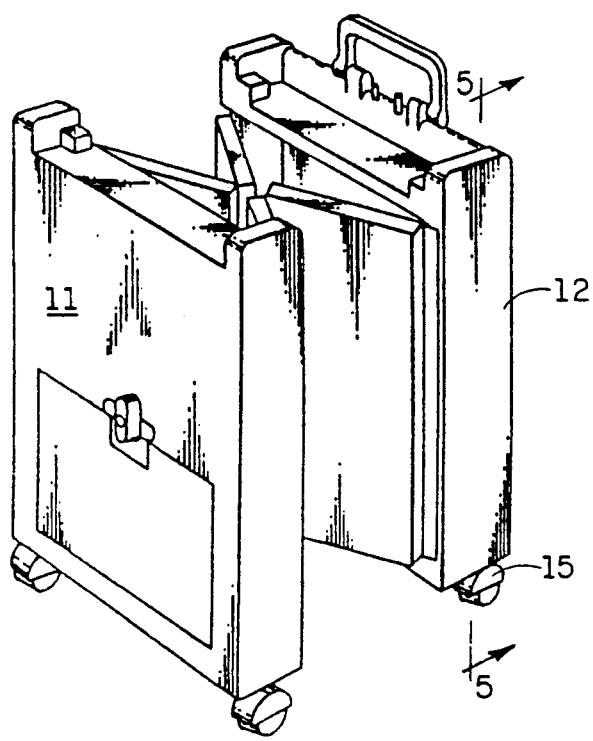
FIG. 4 is a perspective view showing the seat partially collapsed.
Figure 5:
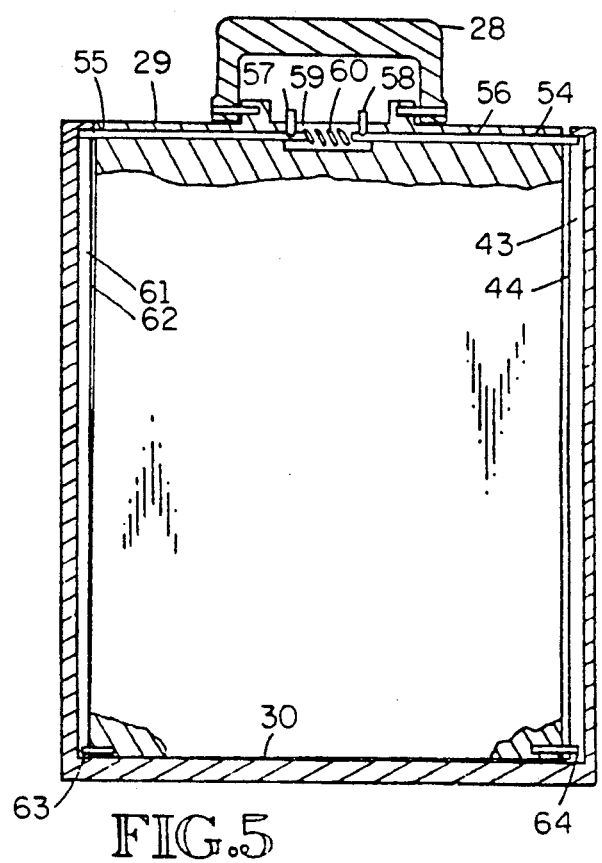
FIG. 5 is a section of the seat, taken at 5—5 in FIG. 4, showing details of the installation of the seat top.

FIG. 5 is a section of the seat taken at 5—5 in FIG. 4, showing details of the installation of the seat top. Pins 54 and 55 slide axially in hole 56 which extends across end 24. Stubs 57 and 58 extend from pins 51 and 52 respectively through slot 59 in end 24. Spring 60 urges the pins to extend into the grooves 44 and 61 in the inner surfaces 45 and 62 of the sides of the back end. When the top, with pins 54 and 55 retracted, held by stubs 57 and 58, is fully inserted into slot 32, the pins are allowed to extend into the grooves to lock the top in its fully inserted position so that the seat can be carried by grip 28. Pins 63 and 64 extend laterally from end 30 of the top into grooves 44 and 61 to guide end 30 as the top is inserted into and extracted from the back end.

Figure 6:
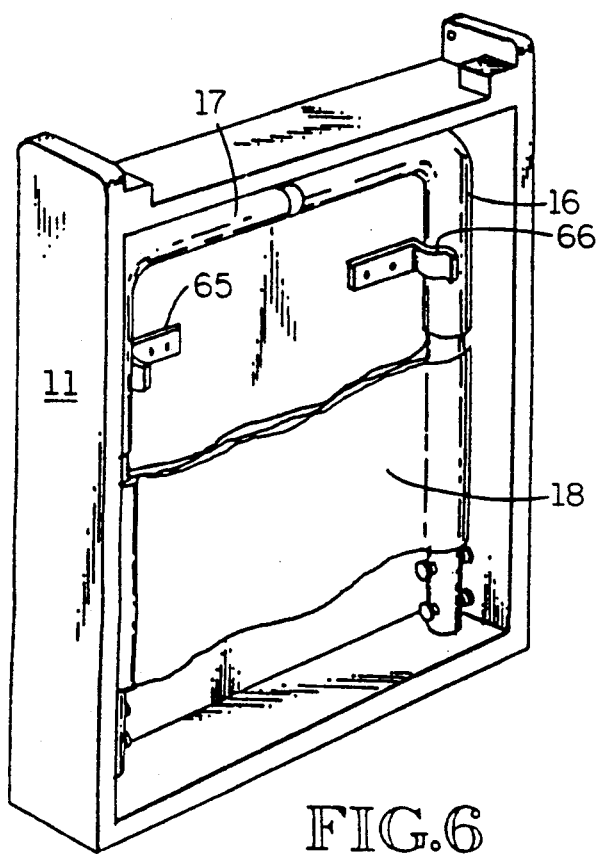
FIG. 6 is a perspective schematic view of the inside of the front end, showing the storage of the handles in the front end.

FIG. 6 is a perspective, schematic view showing the handles 16 and 17 stored inside of front end 11 and held in place by clips 65 and 66. Seat back 18 extends between the handles.

Figure 7:
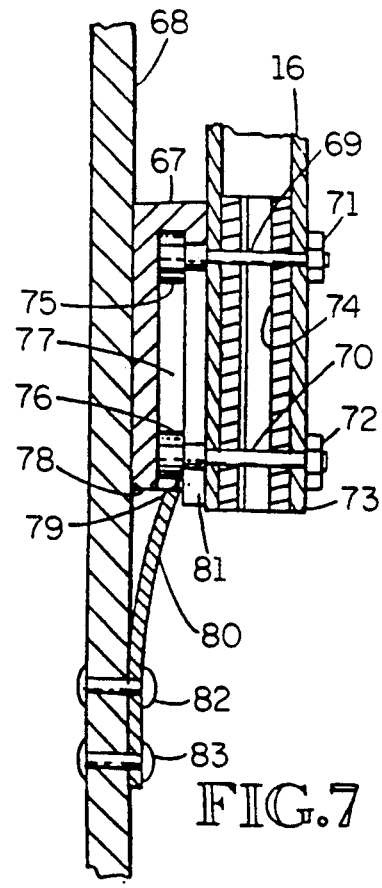
FIG. 7 is a sectional view, taken at 7—7 in FIG. 1, showing details of attachment of the handles.

FIG. 7 is a sectional view taken at 7—7 in FIG. 1 showing details of the attachment of the handles, those for handle 16 being typical. Attachment fixture 67 is attached to the back portion 68 of the back end by fasteners not visible in this view. Specially headed bolts 69 and 70 are fastened by nuts 71 and 72 respectively into end 73 of handle 16. Tube 74 reinforces end 73 and is held in place by the bolts. To install the handle, the handle is maneuvered so that the heads 75 and 76 are moved into T sectioned slot 77 from the bottom end 78 of the attachment fixture, the heads displacing end 79 of leaf spring 80 toward the fixture as the heads are inserted. When both heads are fully into the slot end 79 springs out against shoulder 81 and retains the handle in place. To detach the handle end 79 is pressed out of the way of the heads and the handle is moved downward and out of the slot. Spring 80 is wider than the diameter of the handle end 73 to facilitate access to the spring. The spring is held in place by rivets 82 and 83.

When the top is in its erected condition, extending from the back end to the front end as shown in FIG. 1, pins 54 and 55 engage holes 84 and 85 (FIG. 3, hole 85 not being shown).

Three accessories for the seat are provided: a carrying case, a seat cushion and a seat belt. The cushion is detachably attached to the top of the seat and is detached, folded and stored in the carrying case when the seat is collapsed. The seat belt comprises two sections. One section is attached at one of its ends to one of the handles; the other is attached at one of its ends to the other handle. The other ends of the sections are attachable, detachable by a buckle apparatus which allows adjustment of the effective length of the belt when it is in use.

It is considered to be understandable from the preceding descriptions that the subject invention meets its objectives. It provides a collapsible wheeled seat which provides optimum compromise among its utility, reliability, cost, weight, its size and shape when it is erected and ready to use and its size and shape when it is collapsed. Its simple structure enhances its reliability and structural soundness, enabling it to be light enough to be easily carried by one hand. When erected it is sized and shaped to be stable and fit in the aisles of commercial aircraft. When collapsed it conforms to the commercial airline regulations for carry-on luggage. The simplicity also enables its cost to be what is considered to be reasonable.

It is also believed that it will be understood that while one embodiment of the invention is described herein, other embodiments and modifications of the one described are possible within the scope of the invention which is limited only by the attached claims.

I claim:

1. An erectable/collapsible seat, comprising:
   a front end,
   a back end,
   a first folding side,
   a second folding side,
   a top supported by said front end and said back end when said seat is in an erected condition,
   at least one handle being detachably attached to said back end when said seat is in said erected condition,
   a plurality of casters connected to said front end and back end,
   latching means,
   said first and second sides each comprising a first side member pivotally connected to said front end and a second side member pivotally connected to said back end, said first and second side members on said first side being pivotally connected to define a first axis and said first and second side members on said second side being pivotally connected to define a second axis, whereby said first axis and said second axis translate toward each other when said seat is being collapsed and such that when said sides are folded and in their collapsed condition said front and back ends are in close proximity and can be held in close proximity by said latching means, and such that when said sides are unfolded said front end and back end are spaced apart and said sides are in their erected condition, and
   said top extending between said spaced apart back end and front end when said seat is in said erected condition.

2. An erectable, collapsible wheeled seat, comprising:
   a front end,
   a back end,
   first and second folding sides each having first and second panels connected by first and second hinges, respectively,
   a top having first and second ends supported by said front and back ends when said seat is in an erected condition,
   first and second handles,
   a back rest attached to said handles, and
   a plurality of casters connected to said front end and said back end,
   said front end and said back end having shallow, box shapes, each having a closed face, an open face, first and second ends and first and second sides,
   said front end and said back end being interconnected by said first and second folding sides with said open face of said front end facing said open face of said back end and such that when said seat is erected said first and second panels of said first and second folding sides are in a coplanar configuration and said first and second sides of said front and back ends are vertical and said first ends of said front and back ends are top ends and said second ends of said front and back ends are bottoms, and further such that when said seat is collapsed said first and second folding sides are folded such that said first and second hinges move toward each other and said front and back ends move into close proximity,
   said seat further comprising:
   means for locking said first and second folding sides in said coplanar configurations and
   means for latching said front and back ends in said close proximity,
   said seat further comprising:
   means for detachably attaching said handles to said back end,
   said seat further comprising:
   a foot rest attached to said closed face of said front end.

3. An erectable/collapsible seat, as recited in claim 1, wherein said at least one handle comprises first and second handles.

4. An erectable/collapsible seat, as recited in claim 3, further comprising a back rest connected to said first and second handles.

5. An erectable/collapsible seat, comprising:
   a front end,
   a back end,
   a first folding side,
   a second folding side,
   a top supported by said front end and said back end when said seat is in erected condition,
   at least one handle being detachably attached to said back end when said seat is in said erected condition,
   a plurality of casters connected to said front end and back end,
   latching means,
   said first and second sides being hinged to said front and back ends such that when said sides are folded and in their collapsed condition said front and back ends are in close proximity and can be held in close proximity by said latching means, said first and second sides folding inward toward each other when said seat is being collapsed, and such that when said sides are unfolded said front end and back end are spaced apart and said sides are in their erected condition;

said top extending between said spaced apart back end and front end when said seat is in said erected condition; and a foot rest connected to said front end.

6. An erectable, collapsible seat, comprising:
a front end;
a back end;
a top supported by said front end and said back end when said seat is in an erected condition;
a pair of sides, each of said sides comprising a first side member pivotally connected to said front end and a second side member pivotally connected to said back end, said first and second side members on said first side being pivotally connected to define a first axis and said first and second side members on said second side being pivotally connected to defined a second axis, whereby said first axis and said second axis translate toward each other when said seat is being collapsed and such that when said sides are folded, said front and back ends are in close proximity; and
latching means for releasably holding said front and back ends in close proximity.

7. An erectable, collapsible seat, comprising:
a front end;
a back end;
a top supported by said front end and said back end when said seat is in an erected condition;
a pair of foldable sides, each of said sides comprising a first side member pivotally connected to said front end and a second side member pivotally connected to said back end, said first and second side members on said first side being pivotally connected to define a first axis and said first and second side members on said second side being pivotally connected to define a second axis, whereby said first axis and said second axis translate toward each other when said seat is being collapsed and such that when said sides are folded, said front and said back ends are in close proximity;
means for releasably holding said front and back ends in close proximity; and
means for releasably holding said sides in an unfolded condition.

8. An erectable, collapsible seat, comprising:
a front end;
a back end;
a top supported by said front end and said back end when said seat is in an erected condition; and
a pair of foldable sides, each of said sides comprising a first side member pivotally connected to said front end and a second side member pivotally connected to said back end, said first and second side members on said first side being pivotally connected to define a first axis and said first and second side members on said second side being pivotally connected to define a second axis, whereby said first axis and said second axis translate toward each other when said seat is being collapsed.

9. An erectable, collapsible seat, as recited in claim 8, further comprising a plurality of wheels connected to said front end and said back end.

10. An erectable, collapsible seat, comprising:
a front end;
a back end;
a top supported by said front end and said back end when said seat is in an erected condition;
a pair of foldable sides, each of which are hingedly connected to said front end and said back end, said sides being foldable such that when said sides are folded, said front and said back ends are in close proximity and when said seat is being collapsed, said sides fold inward toward each other; and
a foot rest connected to said front end.

11. An erectable, collapsible seat, as recited in claim 8, further comprising means for releasably holding each of said sides in an unfolded condition.

12. An erectable, collapsible seat, as recited in claim 8, further comprising a pair of handles connected to said back end when said seat is in said erected condition.

13. An erectable, collapsible seat, comprising:
a front end;
a back end;
a top supported by said front end and said back end when said seat is in an erected condition;
a pair of foldable sides, each of which are hingedly connected to said front end and said back end, said sides being foldable such that when said sides are folded, said front and said back ends are in close proximity and when said seat is being collapsed, said sides fold inward toward each other;
a pair of handles connected to said back end when said seat is in said erected condition; and
means for storing said handles between said front end and said back end.

14. An erectable, collapsible seat, comprising:
a first end;
a second end;
a top supported by said first end and said second end when said seat is in an erected condition;
a pair of foldable sides, each of said sides comprising a first side member pivotally connected to said first end and a second side member pivotally connected to said second end, said first and second side members on said first side being pivotally connected to define a first generally upright axis and said first and second side members on said second side being pivotally connected to define a second generally upright axis, whereby said first axis and said second axis translate toward each other when said seat is being collapsed and such that when said sides are folded, said first and second ends are in close proximity; and
means for releasably holding said sides in an unfolded condition.

15. An erectable, collapsible seat, comprising:
a first end;
a second end;
a top supported by said first end and said second end when said seat is in an erected condition; and
a pair of foldable sides, each of said sides comprising a first side member pivotally connected to said first end and a second side member pivotally connected to said second end, said first and second side members on said first side being pivotally connected to define a first generally upright axis and said first and second side members on said second side being pivotally connected to define a second generally upright axis, whereby said first axis and said second axis translate toward each other when said seat is being collapsed and such that when said sides are folded, said first and second ends are in close proximity.

16. A method for erecting a collapsed seat, comprising the steps of:

unfolding a pair of sides, each of said sides comprising a first side member pivotally connected to a front end and a second side member pivotally connected to a back end, said first and second side members on said first side being pivotally connected to define a first axis and said first and second side members on said second side being pivotally connected to define a second axis, whereby said first axis and said second axis translate away from each other when said seat is being erected and such that when said seat is being erected, said sides unfold and said front end and said back end move away from each other;

releasably holding each of said sides in said unfolded condition; and placing a top of said seat so as to be supported by said front end and said back end.

17. A method for collapsing an erected seat, comprising the steps of:

folding a pair of sides, each of said sides comprising a first side member pivotally connected to a front end and a second side member pivotally connected to a back end, said first and second side members on said first being pivotally connected to define a first axis and said first and second side members on said second side being pivotally connected to define a second axis, whereby said first axis and said second axis translate toward each other when said seat is being collapsed; and releasably holding said front end and said back end in close proximity.

18. A method for erecting a collapsed seat, comprising the steps of:

unfolding a pair of sides, each of said sides comprising a first side member pivotally connected to a front end and a second side member pivotally connected to a back end, said first and second side members on said first side being pivotally connected to define a first generally upright axis and said first and second side members on said second side being pivotally connected to define a second generally upright axis, whereby said first axis and said second axis translate away from each other when said seat is being erected;

releasably holding each of said sides in said unfolded condition; and placing a top of said seat so as to be supported by said front end and said back end.

* * * * *